(12) United States Patent
Parfitt

(10) Patent No.: US 7,786,919 B2
(45) Date of Patent: Aug. 31, 2010

(54) SYSTEMS AND/OR DEVICES FOR PROVIDING AN ISOLATED ANALOG OUTPUT OR ANALOG INPUT

(75) Inventor: Steven Perry Parfitt, Johnson City, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 5 days.

(21) Appl. No.: 12/205,099

(22) Filed: Sep. 5, 2008

(65) Prior Publication Data

US 2009/0079612 A1 Mar. 26, 2009

Related U.S. Application Data

(60) Provisional application No. 60/994,748, filed on Sep. 21, 2007, provisional application No. 60/994,747, filed on Sep. 21, 2007.

(51) Int. Cl.
*H03M 1/12* (2006.01)
(52) U.S. Cl. ....................................................... 341/157
(58) Field of Classification Search ................. 341/157; 327/100, 101; 361/182–184
See application file for complete search history.

(56) References Cited

U.S. PATENT DOCUMENTS

| 4,456,808 | A | * | 6/1984 | Wilkinson et al. ............ 219/98 |
| 4,737,712 | A | * | 4/1988 | Stormont et al. ............ 324/307 |
| 4,939,330 | A | * | 7/1990 | Berggren et al. ............ 219/716 |
| 6,181,099 | B1 | * | 1/2001 | Bixel et al. .................. 318/610 |
| 6,392,557 | B1 |   | 5/2002 | Kreuter |
| 6,536,029 | B1 |   | 3/2003 | Boggs |
| 2001/0054174 | A1 | * | 12/2001 | Boggs et al. ................. 327/100 |
| 2003/0117751 | A1 |   | 6/2003 | Murabayashi |
| 2005/0272378 | A1 |   | 12/2005 | Dupuis |
| 2007/0173960 | A1 |   | 7/2007 | Kumar |

FOREIGN PATENT DOCUMENTS

| DE | 3111107 A1 | 9/1982 |
| EP | 1215549 A  | 6/2002 |
| EP |  180631 A  | 7/2007 |
| FR | 2612308 A  | 9/1988 |
| FR | 2765747 A  | 1/1999 |

* cited by examiner

*Primary Examiner*—Howard Williams
(74) *Attorney, Agent, or Firm*—Jose de la Rosa

(57) ABSTRACT

Certain exemplary embodiments can provide a method, which can comprise transmitting a recovered analog input signal to a programmable logic controller. The recovered analog input signal can be converted, on a downstream side of an isolation device, from a converted signal. The recovered analog input signal can have a voltage value that varies according to a frequency value of the converted signal.

16 Claims, 3 Drawing Sheets

SYSTEMS AND/OR DEVICES FOR PROVIDING AN ISOLATED ANALOG OUTPUT OR ANALOG INPUT

CROSS-REFERENCE TO RELATED APPLICATION

This application claims priority to, and incorporates by reference herein in its entirety, U.S. Provisional Patent Application Ser. No. 60/994,748, filed 21 Sep. 2007; and U.S. Provisional Patent Application Ser. No. 60/994,747, filed 21 Sep. 2007.

BACKGROUND

United States Patent Publication 20070173960 (Kumar), which is incorporated by reference herein in its entirety, allegedly discloses a "compact lower cost programmable logic controller with modular I/O is described. SPI bus is used for accessing multi-byte data from I/O modules, while 8 bit data bus is used to access single byte data from I/O modules. Compact I/O modules with use with the PLC are described. The include short circuit proof DC output modules, Relay output with built-in electromagnetic shield, analog modules with laser trimmed resistors, and high speed counter modules." See Abstract.

U.S. Pat. No. 6,536,029 (Boggs), which is incorporated by reference herein in its entirety, allegedly discloses a "programmable logic controller with enhanced and extended the capabilities. A digital input filter implement filters with considerable less logic by simulating the action of a capacitor being driven by a constant current source whose output voltage is sensed by a comparator with a large amount of hysteresis. A pulse catch circuit captures the input pulse even though the update occurs between scan cycles. A pulse output controller includes a hardware pipeline mechanism to allow for smooth, hardware-controlled transitions from wave-form to wave-form. A free port link allows the user to control the port either manually or by operation of a user program. In order to provide higher performance for communication using PPI protocol, the PLC includes a built-in protocol. A n-bit modem protocol ensures data integrity without use of a parity type data integrity system. A hide instruction protects proprietary software by encrypting the sensitive code and decrypting the code during compilation and, thereafter, re-encrypting the code. A system function call allows the user to create and/or download new PLC functions and implement them as PLC operating system functions. An STL status function debugs programs during run-time and while the program is executing. A micro PLC arrangement provides compact size and efficiency." See Abstract.

SUMMARY

Certain exemplary embodiments can provide a method, which can comprise transmitting a recovered analog input signal to a programmable logic controller. The recovered analog input signal can be converted, on a downstream side of an isolation device, from a converted signal. The recovered analog input signal can have a voltage value that varies according to a frequency value of the converted signal.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a method, which can comprise transmitting a recovered analog signal to a programmable logic controller. The recovered analog signal can be converted, on a downstream side of an isolation device, from a converted signal. The recovered analog signal can have a voltage value that varies according to a frequency value of the converted signal.

The processing of analog signals in isolated systems, such as certain programmable logic controller (PLC) systems, can utilize an Analog Output Device (D/A Converter) or Analog Input Device (A/D Converter) that can be located on the opposite side of an isolation boundary from a processing element. Such embodiments can utilize multiple isolation channels to handle clock, Data, and possibly control signals to and from the A/D or D/A converter(s).

Certain exemplary embodiments can reduce a count of isolation devices utilized for analog input and analog output with isolation. Certain exemplary embodiments can provide method for reducing a count of signals that pass through isolation devices by converting the analog signal into a voltage dependent frequency which can be passed across a single isolation device.

The analog input from an external device to be monitored can be fed to a Voltage to Frequency (V/F) Converter. The electrical signal from the V/F Converter can be then sent through a single isolation device. The electrical signal can be fed to the input of a Frequency to Voltage (F/V) converter and/or converted back into an analog signal which can be available for the processing element.

Likewise an analog output signal generated at the processing element can be sent through a V/F converter, passed through an isolation device, and fed to an F/V converter to convert the output signal back to an analog signal to be outputted to control the external devices.

The isolation element can be an Opto-Isolator, transformer, or any other suitable isolation element with sufficient bandwidth for the frequencies involved.

Figure 1:
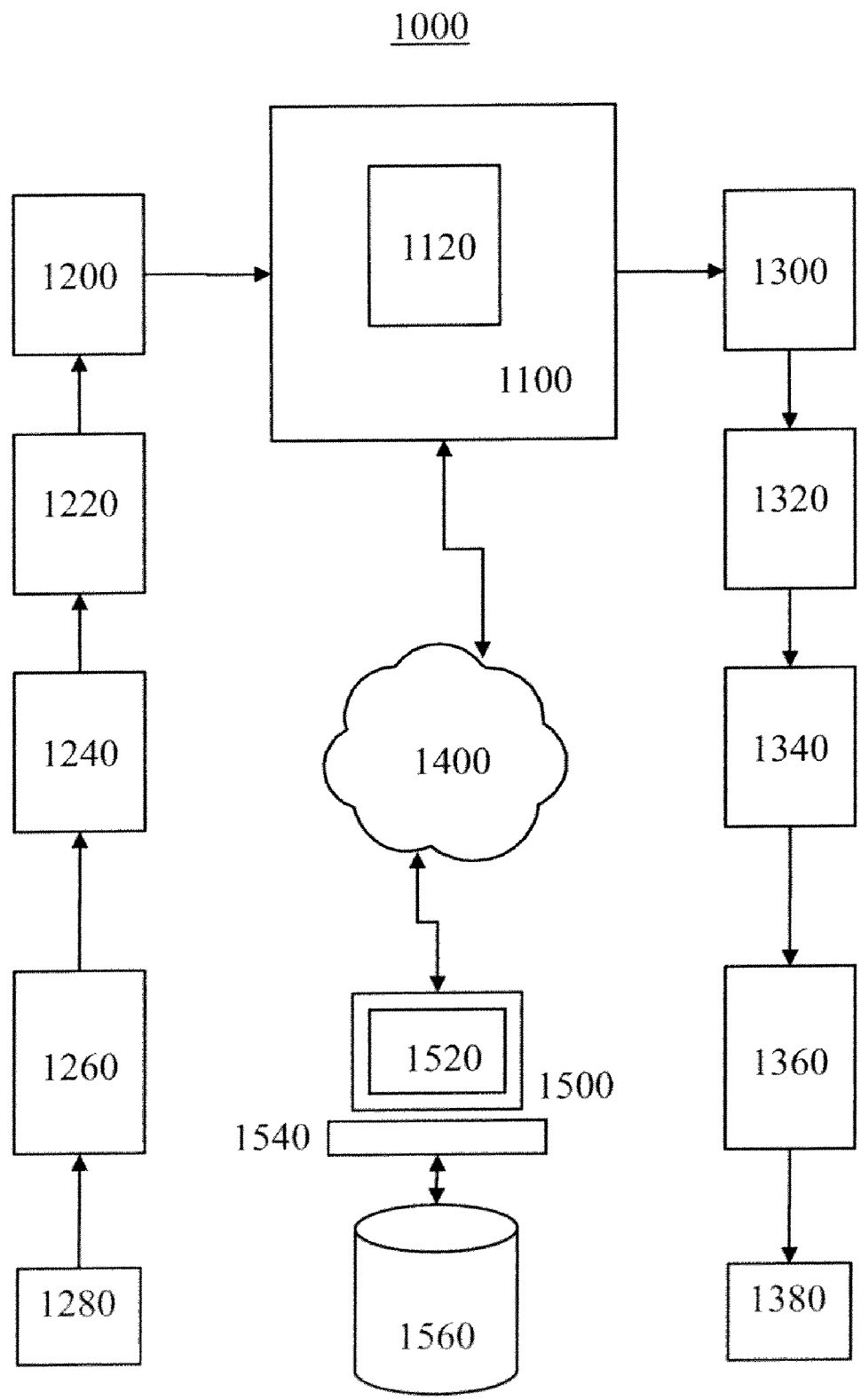
FIG. 1 block diagram of an exemplary embodiment of a system 1000.

FIG. 1 is a block diagram of an exemplary embodiment of a system 1000, which can comprise a programmable logic controller 1100. In certain exemplary embodiments, programmable logic controller 1100 can be communicatively coupled to any desired number of Input/Output modules, such as Input module 1200 and output module 1300. Input module 1200 can be communicatively coupled to any desired number of sensors, such as sensor 1280. Output module 1300 can be communicatively coupled to any desired number of actuators, such as actuator 1380. Input module 1200 and output module 1300 are exemplary modules described herein for illustrative purposes. In certain exemplary embodiments, input module functions and output module functions can be performed via one or more I/O modules that integrate functions performed by input module 1200 and/or output module 1300.

In certain exemplary embodiments, programmable logic controller 1100 can be communicatively coupled to sensor 1280 via input module 1200, a first converter 1220, a first isolation device 1240, and a second converter 1260. In certain exemplary embodiments, programmable logic controller 1100 can be communicatively coupled to actuator 1380 via output module 1300, a third converter 1320, a second isolation device 1340, and a fourth converter 1360. First isolation device 1240 and/or second isolation device 1340 can be opto-isolators and/or transformers. Each of first converter 1220 and fourth converter 1360 can be a frequency-to-voltage converter. Each of second converter 1260 and third converter 1320 can be a voltage-to-frequency converter.

In certain exemplary embodiments, second converter 1260 can be adapted to:
- receive an analog input signal that represents a sensor-detected physical property;
- convert the analog input signal to a converted signal having a constant voltage and a frequency value that varies according to a voltage value of the analog input signal; and/or
- transmit the converted signal across first isolation device 1240.

In certain exemplary embodiments, first converter 1220 can be adapted to:
- receive the converted signal via first isolation device 1240;
- convert the converted signal to a recovered analog input signal having a constant frequency and/or a voltage value that varies according to the frequency value of the converted signal; and/or
- transmit the recovered analog input signal to programmable logic controller 1100 via input module 1200.

In certain exemplary embodiments, third converter 1320 can be adapted to:
- receive an analog output signal adapted to control an actuator via output module 1300;
- convert the converted signal to a recovered analog output signal having a constant frequency and/or a voltage value that varies according to the frequency value of the converted signal; and/or
- transmit the converted signal across second isolation device 1340.

In certain exemplary embodiments, fourth converter 1360 can be adapted to:
- receive the converted signal via second isolation device 1340;
- convert the converted signal to a recovered analog input signal having a constant frequency and/or a voltage value that varies according to the frequency value of the converted signal; and/or
- transmit the analog output signal to actuator 1380.

Programmable logic controller 1100 can be adapted to process the recovered analog input signal to obtain an input value for the sensor-detected physical property. Programmable logic controller 1100 can be adapted to create the analog output signal. In certain exemplary embodiments, output module 1300 can be adapted to create the analog output signal. In certain exemplary embodiments, programmable logic controller 1100 can be adapted to process a digital signal. The digital signal can encode an input value obtained from the recovered analog input signal. The input value can correspond to the sensor-detected physical property. Programmable logic controller 1100 can comprise a human machine interface 1120 adapted to:
- render an input value corresponding to the sensor-detected physical property and/or
- render an analog output value corresponding to the analog output signal.

Programmable logic controller 1100 can be communicatively coupled to an information device 1500 via a network 1400. Information device 1500 can comprise and/or be communicatively coupled to a user interface 1520, a user program 1540, and a memory 1560. User program 1540 can be adapted to monitor and/or control one or more activities associated with programmable logic controller 1100 such as information transfers between programmable logic controller 1100 and input module 1200 and/or information transfers between programmable logic controller 1100 and output module 1300. In certain exemplary embodiments, user program 1540 can be used to create, edit, compile, and/or transmit a control program adapted to cause programmable logic controller 1100 to receive information from sensor 1280 and/or control actuator 1380 in hard real time. User interface 1520 can be adapted to render information regarding programmable logic controller 1100 such as control program information and/or information transfers between programmable logic controller 1100 and input module 1200 and/or output module 1300. Memory 1560 can be adapted to store and/or retrieve information regarding programmable logic controller 1100.

Figure 2:
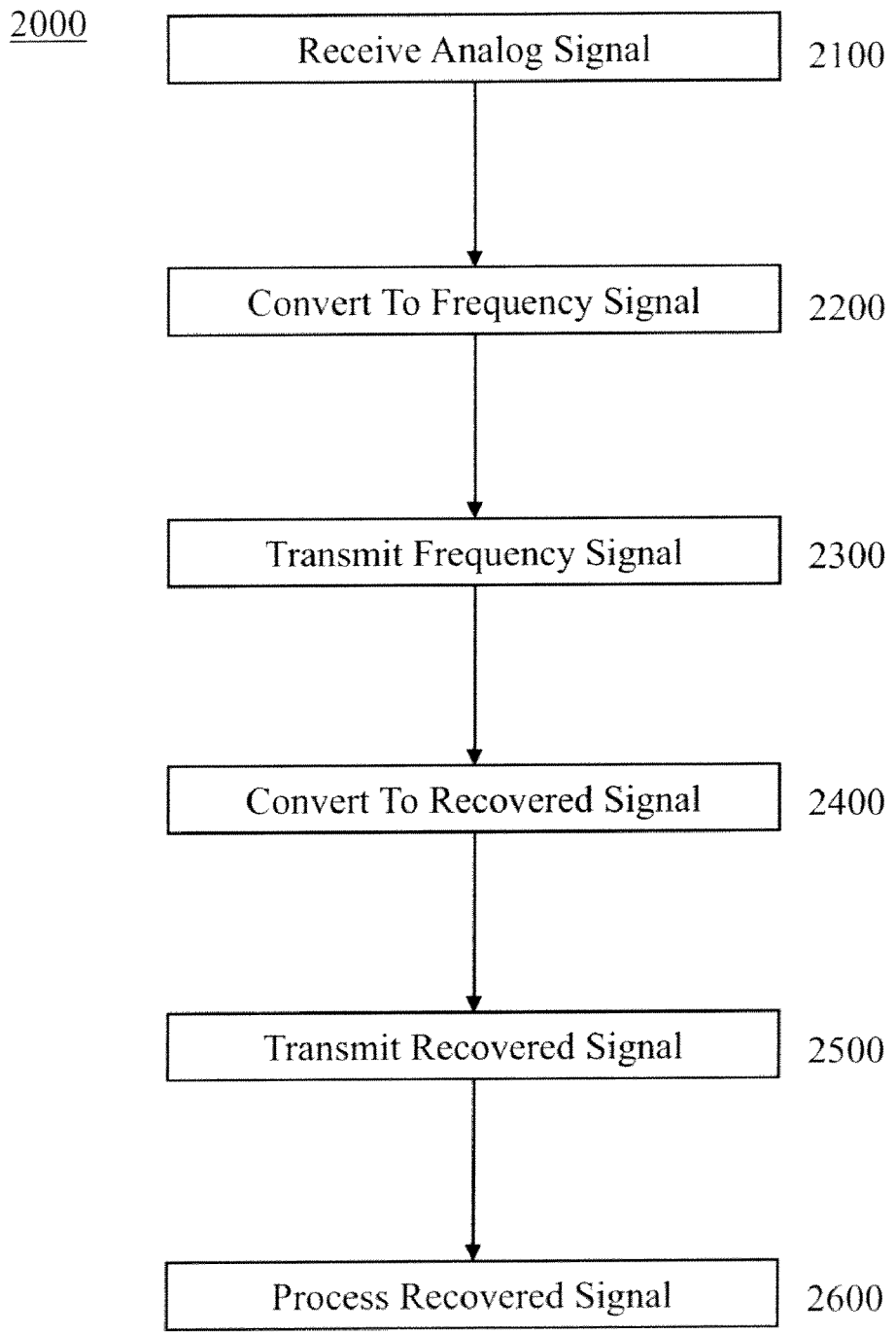
FIG. 2 is a flowchart of an exemplary embodiment of a method 2000.

FIG. 2 is a flowchart of an exemplary embodiment of a method 2000. One or more activities of method 2000 can be performed automatically. For example, one or more activities of method 2000 can be performed via machine-implementable instructions stored on a machine-readable medium. At activity 2100, an analog signal can be received. In certain exemplary embodiments, the analog signal can be received from a sensor, such as via an Input/Output module. The analog signal can be an analog input signal that represents a sensor-detected physical property. In certain exemplary embodiments, the analog signal can be an analog output signal adapted to control an actuator. In embodiments wherein the analog output signal is adapted to control an actuator, the analog output signal can be created, such as via a programmable logic controller.

At activity 2200, the analog signal can be converted to a frequency signal. The frequency signal can be a converted signal having a constant voltage and a frequency value that varies according to a voltage value of the analog signal.

At activity 2300, the frequency signal can be transmitted across an isolation device. The isolation device can be an opto-isolator and/or a transformer.

At activity 2400, on a downstream side of the isolation device, the frequency signal can be converted to a recovered signal. The recovered signal can be a recovered analog signal having a constant frequency and/or a voltage value that varies according to a the frequency value of the converted signal At activity 2500, the recovered signal can be transmitted. In certain exemplary embodiments, the recovered signal can be transmitted to the programmable logic controller. In certain exemplary embodiments, the recovered signal can be transmitted to an actuator.

At activity 2600, the programmable logic controller can process the recovered signal. For example, the recovered analog input signal can be processed to obtain an analog input value for a sensor-detected physical property. Certain exemplary embodiments can be adapted to render an analog input value corresponding to the sensor-detected physical property at a human machine interface coupled to the programmable logic controller. Certain exemplary embodiments can be adapted to render an analog output value corresponding to the analog output signal at the human machine interface coupled to the programmable logic controller.

Figure 3:
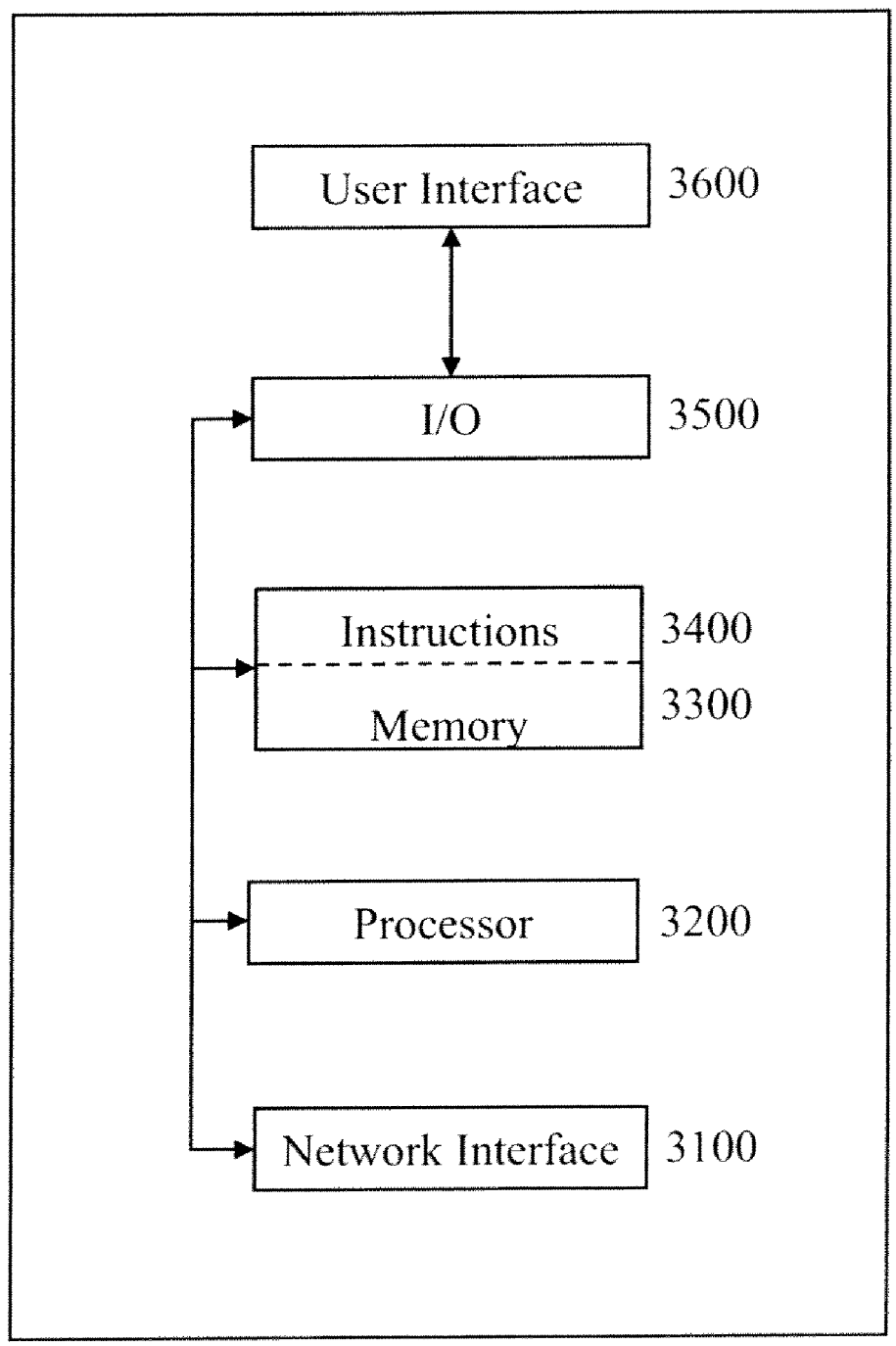
FIG. 3 is a block diagram of an exemplary embodiment of an information device 3000.

FIG. 3 is a block diagram of an exemplary embodiment of an information device 3000, which in certain operative embodiments can comprise, for example, information device 1500 of FIG. 1. Information device 3000 can comprise any of numerous circuits and/or components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

In certain exemplary embodiments, via one or more user interfaces 3600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
according—to conform and/or be in accord with.
across—from one side to an opposing side.
activity—an action, act, deed, function, step, and/or process and/or a portion thereof.
actuator—a device that converts, translates, and/or interprets signals (e.g., electrical, optical, hydraulic, pneumatic, etc.) to cause a physical and/or humanly perceptible action and/or output, such as a motion (e.g., rotation of a motor shaft, vibration, position of a valve, position of a solenoid, position of a switch, and/or position of a relay, etc.), audible sound (e.g., horn, bell, and/or alarm, etc.), and/or visible rendering (e.g., indicator light, non-numerical display, and/or numerical display, etc).
adapted to—suitable, fit, and/or capable of performing a specified function.
adapter—a device used to effect operative compatibility between different parts of one or more pieces of an apparatus or system.
analog—a signal formed from continuous measurement and/or input.
apparatus—an appliance and/or device for a particular purpose.
associate—to relate, bring together in a relationship, map, combine, join, and/or connect.
automatically—acting and/or operating in a manner essentially independent of external human influence and/or control. For example, an automatic light switch can turn on upon "seeing" a person in its view, without the person manually operating the light switch.
can—is capable of, in at least some embodiments.
cause—to bring about, provoke, precipitate, produce, elicit, be the reason for, result in, and/or effect.
circuit—an electrically conductive pathway and/or a communications connection established across two or more switching devices comprised by a network and between corresponding end systems connected to, but not comprised by the network.
comprising—including but not limited to, what follows.
configure—to design, arrange, set up, shape, and/or make suitable and/or fit for a specific purpose.
connect—physically or logically join, link, couple, and/or fasten two or more entities.
constant—continually occurring; persistent; and/or unchanging.
control—(n) a mechanical or electronic device used to operate a machine within predetermined limits; (v) to exercise authoritative and/or dominating influence over, cause to act in a predetermined manner, direct, adjust to a requirement, and/or regulate.
convert—to transform, adapt, and/or change, such as from a first form to a second form.
converter—a device that transforms.
corresponding—related, associated, accompanying, similar in purpose and/or position, conforming in every respect, and/or equivalent and/or agreeing in amount, quantity, magnitude, quality, and/or degree.
coupleable—capable of being joined, connected, and/or linked together.
create—to make, form, produce, generate, bring into being, and/or cause to exist.
data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.
deadline—a time interval during which an activity's completion has more utility to a system, and after which the activity's completion has less utility. Such a time interval might be constrained only by an upper-bound, or it might be constrained by both upper and lower bounds.
define—to establish the meaning, relationship, outline, form, and/or structure of; and/or to precisely and/or distinctly describe and/or specify.
detect—to sense, perceive, identify, discover, ascertain respond to, and/or receive the existence, presence, and/or fact of.
determine—to obtain, calculate, decide, deduce, establish, and/or ascertain.
device—an instrumentality adapted to a particular purpose.
digital—non-analog; discrete.
downstream—with and/or in a direction of flow of an electrical current.
encoding—the process of transforming a linear digital information stream into another digital data stream, such as for the purpose of maximizing information content as desired for a particular application, while minimizing the information rate (bandwidth) (e.g., G.711, G.722, G.728, etc).
estimate—to calculate and/or determine approximately and/or tentatively.
frequency—the number of times a specified periodic phenomenon occurs within a specified interval.
from—used to indicate a source.
further—in addition.
generate—to create, produce, render, give rise to, and/or bring into existence.
haptic—both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

hard deadline—the special case where completing an activity within the deadline results in the system receiving all the utility possible from that activity, and completing the activity outside of the deadline results in zero utility (i.e., resources consumed by the activity were wasted, such as when one travels to the beach to photograph a sunrise on a particular day and arrives after the sun has already arisen) or some negative value of utility (i.e., the activity was counter-productive, such as when firefighters enter a burning building to search for a missing person seconds before the building collapses, resulting in injury or death to the firefighters). The scheduling criterion for a hard deadline is to always meet the hard deadline, even if it means changing the activity to do so.

hard real-time—relating to computer systems that provide an absolute deterministic response to an event. Such a response is not based on average event time. Instead, in such computer systems, the deadlines are fixed and the system must guarantee a response within a fixed and well-defined time. Systems operating in hard real-time typically interact at a low level with physical hardware via embedded systems, and can suffer a critical failure if time constraints are violated. A classic example of a hard real-time computing system is the anti-lock brakes on a car. The hard real-time constraint, or deadline, in this system is the time in which the brakes must be released to prevent the wheel from locking. Another example is a car engine control system, in which a delayed control signal might cause engine failure or damage. Other examples of hard real-time embedded systems include medical systems such as heat pacemakers and industrial process controllers.

Human Machine Interface—hardware and/or software adapted to render information to a user and/or receive information from the user.

information—facts, terms, concepts, phrases, expressions, commands, numbers, characters, and or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

initialize—to create, produce, render, give rise to, and/or bring into existence.

input—a signal, data, and/or information provided to a processor, device, and/or system.

Input/Output (I/O) device—an input/output (I/O) device of an information device can be any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

Input/Output module—a device and/or system adapted to receive and/or forward information between a programmable logic controller (PLC) and a predetermined set of sensors and/or actuators.

install—to connect and/or place in position and prepare for use.

interface—(n) a boundary across which two independent systems meet and act on and/or communicate with each other. (v) to connect with and/or interact with by way of an interface.

isolation device—a device adapted to transfer a signal between a first element and a second element of a circuit, the device adapted to substantially electrically isolate the first element from the second element such that electrical continuity along a path between the first element and the second elements is substantially broken.

machine-implementable instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

may—is allowed and/or permitted to, in at least some embodiments.

memory device—an apparatus capable of storing analog or digital information, such as instructions and/or data.

Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something module—a set of instructions for operating a processor.

network—a communicatively coupled plurality of nodes, communication devices, and or information devices. Via a network, such devices can be linked, such as via various wireline and/or wireless media, such as cables telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof, network interface—any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

obtain—to receive, get, take possession of, procure, acquire, calculate, determine, and/or compute.

opto-isolator—a device that uses an optical transmission path to transfer a signal between a first element and a second element of a circuit, the device adapted to substantially electrically isolate the first element from the second element since the signal goes from an electrical signal to an optical signal back to an electrical signal such that electrical continuity along a path between the first element and the second elements is substantially broken.

output—(n.) something produced and/or generated; data produced by an information device executing machine-readable instructions; and/or the energy, power, work, signal, and/or information produced by a system; (v.) to provide, produce, manufacture, and/or generate.

packet—a generic term for a bundle of data organized in a specific way for transmission, such as within and/or across a network, such as a digital packet-switching network, and comprising the data to be transmitted and certain control information, such as a destination address.

physical property—tangible, real, and/or actual characteristic.

plurality—the state of being plural and/or more than one.

predetermined—determine, decide, or establish in advance.

process—(n.) an organized series of actions, changes, and/or functions adapted to bring about a result. (v.) to perform mathematical and/or logical operations according to programmed instructions in order to obtain desired information and/or to perform actions, changes, and/or functions adapted to bring about a result.

processor—a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

programmable logic controller (PLC)—a solid-state, microprocessor-based, hard real-time computing system that is used, via a network, to automatically monitor the status of field-connected sensor inputs, and automatically control communicatively-coupled devices of a controlled industrial system (e.g., actuators, solenoids, relays, switches, motor starters, speed drives (e.g., variable frequency drives, silicon-controlled rectifiers, etc.), pilot lights, igniters, tape drives, speakers, printers, monitors displays, etc.) according to a user-created set of values and user-created logic and/or instructions stored in memory. The sensor inputs reflect measurements and/or status information related to the controlled industrial system. A PLC provides any of: automated input/output control; switching; counting; arithmetic operations; complex data manipulation; logic; timing; sequencing; communication; data file manipulation; report generation; control; relay control; motion control; process control; distributed control; and/or monitoring of processes, manufacturing equipment, and/or other automation of the controlled industrial system. Because of its precise and hard real-time timing and sequencing capabilities, a PLC is programmed using ladder logic or some form of structured programming language specified in IEC 61131-3, namely, FBD (Function Block Diagram), LD (Ladder Diagram), ST (Structured Text, Pascal type language), IL (Instruction List) and/or SFC (Sequential Function Chart). Because of its precise and real-time timing and sequencing capabilities, a PLC can replace up to thousands of relays and cam timers. PLC hardware often has good redundancy and fail-over capabilities. A PLC can use a Human-Machine Interface (HMI) for interacting with users for configuration, alarm reporting, and/or control.

project—to calculate, estimate, or predict.

provide—to furnish, supply, give, convey, send, and/or make available.

real-time—a system (or sub-system) characterized by time constraints on individual activities and scheduling criteria for using those time constraints to achieve acceptable system timeliness with acceptable predictability.

receive—to gather, take, acquire, obtain, accept, get, and/or have bestowed upon.

recommend—to suggest, praise, commend, and/or endorse.

recover—to get back and/or regain.

render—to display, annunciate, speak print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc.

repeatedly—again and again; repetitively.

represent—to describe and/or symbolize.

representative—descriptive and or symbolic of.

request—(v.) to express a need and/or desire for; to inquire and/or ask for. (n.) that which communicates an expression of desire and/or that which is asked for.

said—when used in a system or device claim, an article indicating a subsequent claim term that has been previously introduced.

select—to make and/or indicate a choice and/or selection from among alternatives.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, and/or electro-magnetic radiation, etc.) and convert that physical quantity into a signal. Examples include proximity switches, stain gages, photo sensors, thermocouples, level indicating devices, speed sensors, accelerometers, electrical voltage indicators, electrical current indicators, on/off indicators, and/or flowmeters, etc.

set—a related plurality of predetermined elements; and/or one or more distinct items and/or entities having a specific common property or properties.

side—a surface bounding a solid object.

signal—information encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal can be synchronous, asynchronous, hard real-time, soft real-time, non-real time, continuously generated, continuously varying analog, discretely generated, discretely varying, quantized, digital, continuously measured, and/or discretely measured, etc.

soft deadline—the general case where completing an activity by a deadline results in a system receiving a utility measured in terms of lateness (completion time minus deadline), such that there exist positive lateness values corresponding to positive utility values for the system. Lateness can be viewed in terms of tardiness (positive lateness), or earliness (negative lateness). Generally, and potentially within certain bounds, larger positive values of lateness or tardiness represent lower utility, and larger positive values of earliness represent greater utility.

soft real-time—relating to computer systems that take a best efforts approach and minimize latency from event to response as much as possible while keeping throughput up with external events overall. Such systems will not suffer a critical failure if time constraints are violated. For example, live audio-video systems are usually soft real-time; violation of time constraints can result in degraded quality, but the system can continue to operate. Another example is a network server, which is a system for which fast response is desired but for which there is no deadline. If the network server is highly loaded, its response time may slow with no failure in service. This is contrasted with an anti-lock braking system where a slow down in response would likely cause system failure, possibly even catastrophic failure.

store—to place, hold, retain, enter, and/or copy into and/or onto a machine-readable medium.

substantially—to a considerable, large, and/or great, but not necessarily whole and/or entire, extent and/or degree.

support—to bear the weight of, especially from below.

system—a collection of mechanisms, devices, machines, articles of manufacture, processes, data, and/or instructions, the collection designed to perform one or more specific functions.

transformer—a device adaptable to transfer electric energy from one circuit to another. A transformer can comprise a pair of multiply wound, inductively coupled wire coils that effect such a transfer with a change in voltage, current, phase, and/or other electric characteristic.

transmit—to provide, furnish, supply, send as a signal, and/or to convey (e.g., force, energy, and/or information) from one place and/or thing to another.

user—a person, organization, process, device, program, protocol, and/or system that uses a device, system, process, and/or service.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

value—a measured, assigned, determined, and/or calculated quantity or quality for a variable and/or parameter.

varies—changes over time.

via—by way of and/or utilizing.

voltage—(a.k.a., "potential difference" and "electromotive force" (EMF)) a difference in electrical potential between any two conductors of an electrical circuit and/or a quantity, expressed as a signed number of Volts (V), and measured as a signed difference between two points in an electrical circuit which, when divided by the resistance in Ohms between those points, gives the current flowing between those points in Amperes, according to Ohm's Law.

voltage-to-frequency converter—a device and/or system adapted to transform a variable signal having a modulated voltage to a transformed variable signal having a modulated frequency that is derived from the modulated voltage of the variable signal.

weight—a force with which a body is attracted to Earth or another celestial body, equal to the product of the object's mass and the acceleration of gravity; and/or a factor assigned to a number in a computation, such as in determining an average, to make the number's effect on the computation reflect its importance.

wherein—in regard to which; and; and/or in addition to.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A system comprising:
   a voltage-to-frequency converter adapted to:
      receive an analog input signal that represents a sensor-detected physical property;
      convert said analog input signal to a converted signal having a constant voltage and a frequency value that varies according to a voltage value of said analog input signal; and
      transmit said converted signal across an isolation device; and
   a frequency-to-voltage converter adapted to:
      receive said converted signal;
      convert said converted signal to a recovered analog input signal having a voltage value that varies according to said frequency value of said converted signal;
      transmit said recovered analog input signal to a programmable logic controller;
   a second voltage-to-frequency converter adapted to:
      receive an analog output signal adapted to control an actuator from the programmable logic controller;
      convert said analog output signal to a converted signal having a constant voltage and a frequency value that varies according to a voltage value of said analog output signal;

transmit said converted signal across an isolation device; and a second frequency-to-voltage converter adapted to:
receive a converted signal;
convert said converted signal to a recovered analog output Signal having a voltage value that varies according to said frequency value of said converted output signal; and
transmit said analog output signal to said actuator; and an information device communicatively coupled to the programmable logic controller via a network, the information device including a user program adapted to
monitor one or more activities of the programmable logic controller, or
create, edit, compile or transmit a control program.

2. The system of claim 1, wherein:
the programmable logic controller adapted to process said recovered analog input signal to obtain an input value for said sensor-detected physical property.

3. The system of claim 1, comprising:
an analog input module adapted to convert said recovered analog input signal to a digital input signal.

4. The system of claim 1, wherein:
the programmable logic controller adapted to process a digital signal, said digital signal encoding an input value obtained from said recovered analog input signal, said input value corresponding to said sensor-detected physical property.

5. The system of claim 1, comprising:
a human machine interface adapted to render an input value corresponding to said sensor-detected physical property.

6. The system of claim 1, wherein:
said isolation device is an opto-isolator.

7. The system of claim 1, wherein:
said isolation device is a transformer.

8. A system comprising:
a voltage-to-frequency converter adapted to:
receive an analog output signal adapted to control an actuator from a programmable logic controller;
convert said analog output signal to a converted signal having a constant voltage and a frequency value that varies according to a voltage value of said analog output signal;
transmit said converted signal across an isolation device; and a frequency-to-voltage converter adapted to:
receive said converted signal;
convert said converted signal to a recovered analog output signal having a voltage value that varies according to said frequency value of said converted signal;
transmit said analog output signal to said actuator; and an information device communicatively coupled to the programmable logic controller via a network, the information device including a user program adapted to
monitor one or more activities of the programmable logic controller, or
create, edit, compile or transmit a control program.

9. The system of claim 8, wherein the programmable logic controller is adapted to create said analog output signal.

10. The system of claim 8, further comprising:
an output module adapted to create said analog output signal.

11. The system of claim 8, wherein the programmable logic controller adapted to provide an analog output value corresponding to said analog output signal to a human machine interface.

12. The system of claim 8, further comprising:
a human machine interface adapted to render an analog output value corresponding to said analog output signal.

13. The system of claim 8, further comprising:
said isolation device is an opto-isolator.

14. The system of claim 8, further comprising:
said isolation device is a transformer.

15. The system of claim 8, further comprising:
a voltage-to-frequency converter adapted to:
receive an analog input signal that represents a sensor-detected physical property;
convert said analog input signal to a converted signal having a constant voltage and a frequency value that varies according to a voltage value of said analog input signal; and
transmit said converted signal across an isolation device; and a frequency-to-voltage converter adapted to:
receive said converted signal;
convert said converted signal to a recovered analog input signal having a voltage value that varies according to said frequency value of said converted signal; and
transmit said recovered analog input signal to the programmable logic controller.

16. A method comprising:
receiving an analog input signal that represents a sensor-detected physical property;
converting said analog input signal to a converted signal having a constant voltage and a frequency value that varies according to a voltage value of said analog input signal;
transmitting said converted signal across an isolation device;
on a downstream side of said isolation device, converting said converted signal to a recovered analog input signal having a voltage value that varies according to said frequency value of said converted signal;
transmitting said recovered analog input signal to a programmable logic controller;
in a voltage-to-frequency converter:
receiving an analog output signal adapted to control an actuator from the programmable logic controller;
converting said analog output signal to a converted signal having a constant voltage and a frequency value that varies according to a voltage value of said analog output signal;
transmitting said converted signal across an isolation device;
in a frequency-to-voltage converter:
receiving said converted signal;
converting said converted signal to a recovered analog output signal having a voltage value that varies according to said frequency value of said converted signal; and
transmitting said analog output signal to said actuator; and
communicatively coupling an information device to the programmable logic controller via a network, the information device including a user program; and
monitoring with the user program one or more activities of the programmable logic controller, or
using the user program to create, edit, compile or transmit a control program.

* * * * *